United States Patent
Ziegler et al.

(10) Patent No.: US 6,296,561 B1
(45) Date of Patent: Oct. 2, 2001

(54) AIR RETURN BULKHEAD FOR TEMPERATURE CONTROLLED TRAILERS

(75) Inventors: David B. Ziegler, South Eden Prairie; Robert L. Sirotek, Jr., Apple Valley, both of MN (US); Pat Hotch, Yorba Linda, CA (US); Gregg George, Schanumburg, IL (US); Kevin W. Kiefer, New Brighton; Randal Gast, Jordan, both of MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 09/386,725

(22) Filed: Aug. 31, 1999

(51) Int. Cl.[7] .................................................... B60H 1/00
(52) U.S. Cl. .............................. 454/118; 454/91; 165/41; 165/42; 62/239
(58) Field of Search ........................ 454/118, 91; 165/43, 165/42, 41; 62/407, 239

(56) References Cited

U.S. PATENT DOCUMENTS

| | | |
|---|---|---|
| 1,716,867 | 6/1929 | Simms . |
| 1,780,765 | 11/1930 | O'Connor . |
| 2,133,722 | 10/1938 | Sisson . |
| 2,238,700 | 4/1941 | Lundvall . |
| 2,260,999 | 10/1941 | Mann . |
| 2,316,265 | 4/1943 | Lundvall . |
| 2,544,242 | 3/1951 | Van Dorn et al. . |
| 3,354,839 | 11/1967 | Lich et al. . |
| 3,680,492 | 8/1972 | Weage . |
| 3,762,341 | 10/1973 | Adler . |
| 4,049,311 | 9/1977 | Dietrich et al. . |
| 4,161,145 | 7/1979 | Patterson, III . |
| 4,358,233 | 11/1982 | Morris et al. . |
| 4,517,882 | * 5/1985 | Watanabe et al. .................. 454/118 |
| 4,639,031 | 1/1987 | Truckenbrodt . |
| 4,726,196 | 2/1988 | Zajic . |
| 4,880,342 | 11/1989 | Pradovic . |
| 4,884,722 | 12/1989 | Podd . |
| 5,129,235 | 7/1992 | Renken et al. . |
| 5,769,704 | 6/1998 | Henning et al. . |
| 5,807,046 | 9/1998 | Onken . |
| 6,116,044 | * 9/2000 | Gothier .................................. 454/91 |

OTHER PUBLICATIONS

Thermo King Parts Bulletin 1244, dated Dec. 19, 1997.

* cited by examiner

Primary Examiner—Jiping Lu
(74) Attorney, Agent, or Firm—Michael Best & Friedrich LLP

(57) ABSTRACT

An air return bulkhead comprising a base; a return air duct extending outward from the base, the base and air duct defining a bulkhead return air chamber, the duct comprising a first wall, a second wall, a third wall, a fourth wall, and a fifth wall joining the other walls; at least one return air inlet notch formed in the air duct fourth and fifth walls; and means for producing turbulent return air flow through the return air chamber, said means located downstream from the at least one inlet notch. The bulkhead further includes air dam positioning means on the first and second walls. Individual air dam members are slid in the positioning means to be removably mounted along the bulkhead.

23 Claims, 8 Drawing Sheets

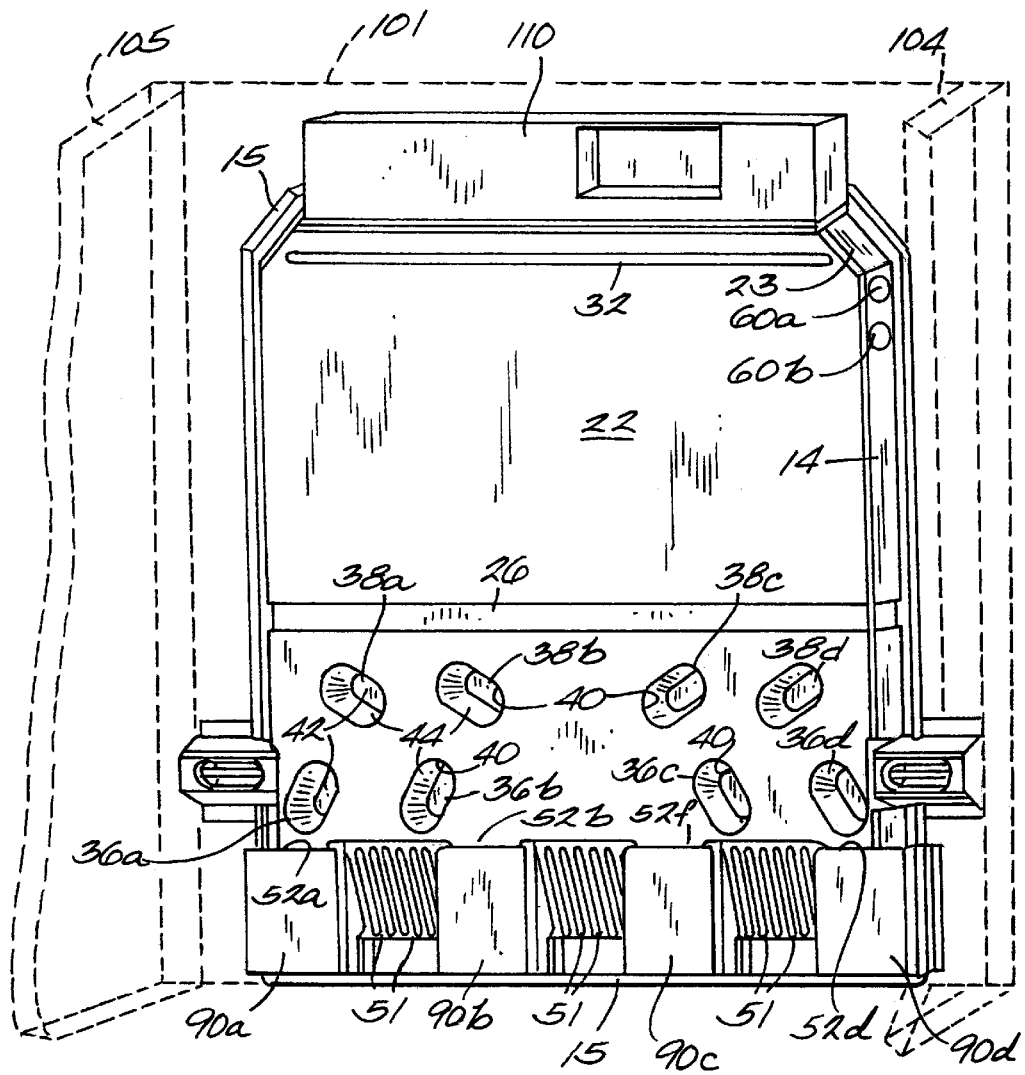

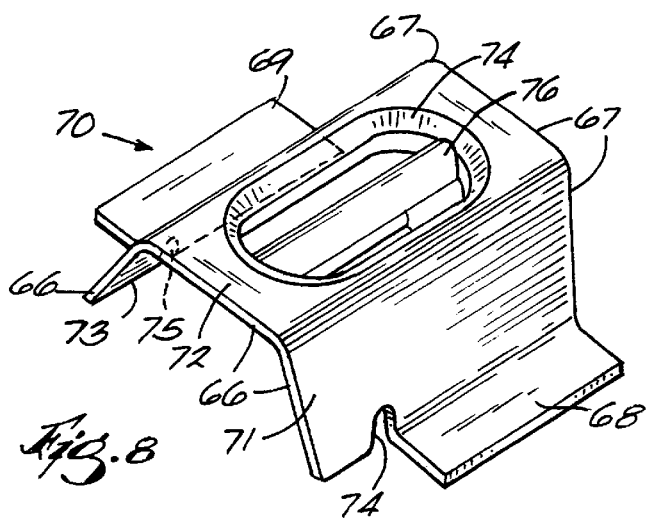
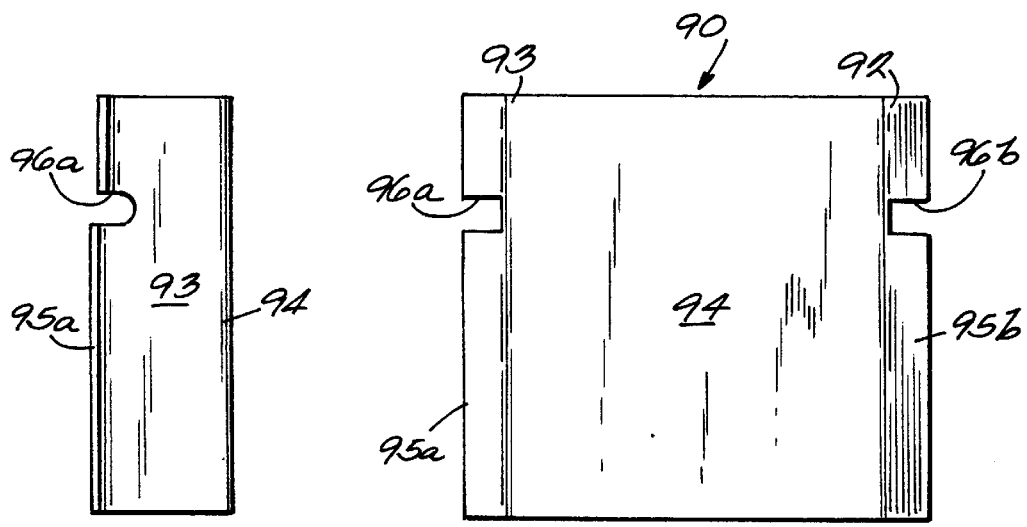
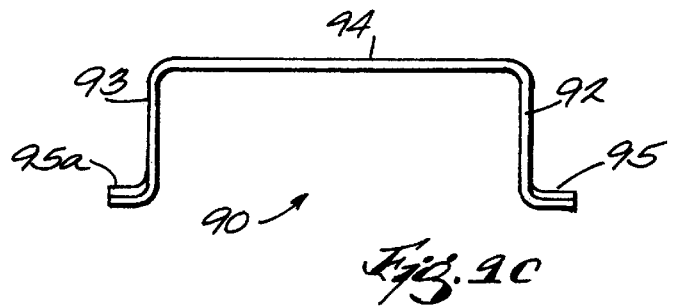

AIR RETURN BULKHEAD FOR TEMPERATURE CONTROLLED TRAILERS

BACKGROUND OF THE INVENTION

This invention generally relates to an air return bulkhead used in temperature controlled trailers to maintain the desired flow of temperature controlled air through the trailer conditioned space; and more particularly the invention relates to a bulkhead that is easily installed in the trailer and prevents short cycling of the temperature controlled air in the conditioned space.

Temperature control units for use in trailers are mounted on a trailer which defines a conditioned space, and the air in the conditioned space is maintained at a predetermined desired temperature by the temperature control unit which is typically mounted on the front trailer wall or panel. The temperature control unit evaporator extends through the front trailer wall and into the conditioned space. A load of palletized cargo is loaded into the conditioned space and the evaporator serves to cool and force the conditioned air into the conditioned space and around the palletized load in the manner generally indicated by arrows 150 in FIG. 1. The conditioned air is forced rearwardly out the evaporator, around the back of the load and below the load and back to the front of the trailer.

An air return bulkhead is located at the front of the trailer and is typically attached to the interior of the front trailer wall and behind the temperature control unit. Prior art bulkheads have inlet openings which permit the air to pass behind the bulkhead and directly into the evaporator. The return air passes through the evaporator and the majority of the discharged volume of conditioned air returns to the conditioned space. However a portion of the conditioned air does not flow to the back of the trailer but rather "short cycles". Rather than flowing rearwardly and around the load, the short cycling air remains at the front of the load and simply returns to the evaporator through the bulkhead inlet openings. The short cycling conditioned air can negatively affect the temperature of the conditioned air.

It is well known to one skilled in the relevant art that short cycling is not desirable when frozen loads are in the conditioned space. However, a small volume of short cycled air is desirable for fresh loads such as lettuce. Therefore, it would be desirable to provide a means for easily selectably changing between permitting and preventing short cycling in bulkheads.

The foregoing illustrates limitations known to exist in present air return bulkheads. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an air return bulkhead comprising a base; a return air duct extending outward from the base, the base and air duct defining a bulkhead return air chamber, the duct comprising a first wall, a second wall, a third wall, a fourth wall, and a fifth wall joining the other walls; at least one return air inlet notch formed in the air duct fourth and fifth walls; and means for producing turbulent return air flow through the return air chamber, said means located downstream from the at least one inlet notch. The bulkhead further includes air dam positioning means on the first and second walls. Individual air dam members are slid in the positioning means to be removably mounted along the bulkhead.

Molded pallet stops are formed in the fifth wall and fourth wall. Additionally removable pallet stops may overlay the molded pallet stops so that if the pallet stops are damaged during cargo loading only the pallet stop would need to be replaced.

A seam is provided along the fifth, first and second walls and permits the bulkhead to be cut to permit access to the evaporator unit without removing the bulkhead and also to permit the bulkhead to be shipped in two pieces with the temperature control unit.

The means for producing turbulent air flow through the chamber is comprised of a first aligned array of support columns directed toward the center of the bulkhead in the direction of return air flow through the chamber and a second aligned array of support columns directed away from the center of the bulkhead in the direction of return air flow through the chamber.

The foregoing and other aspects will become apparent from the following detailed description of the invention when considered in conjunction with the accompanying drawing figures.

BRIEF DESCRIPTION OF THE DRAWING FIGURES

FIG. 7 is a front perspective view of the bulkhead of FIG. 2 with removable air dams and pallet stops oriented for use in combination with the bulkhead;

FIG. 8 is an isometric view of one of the removable air dams shown in FIG. 7; and FIGS. 9a, 9b, and 9c are respectively front, left side and bottom views of one of the removable pallet stops shown in FIG. 7.

DETAILED DESCRIPTION

Figure 1:
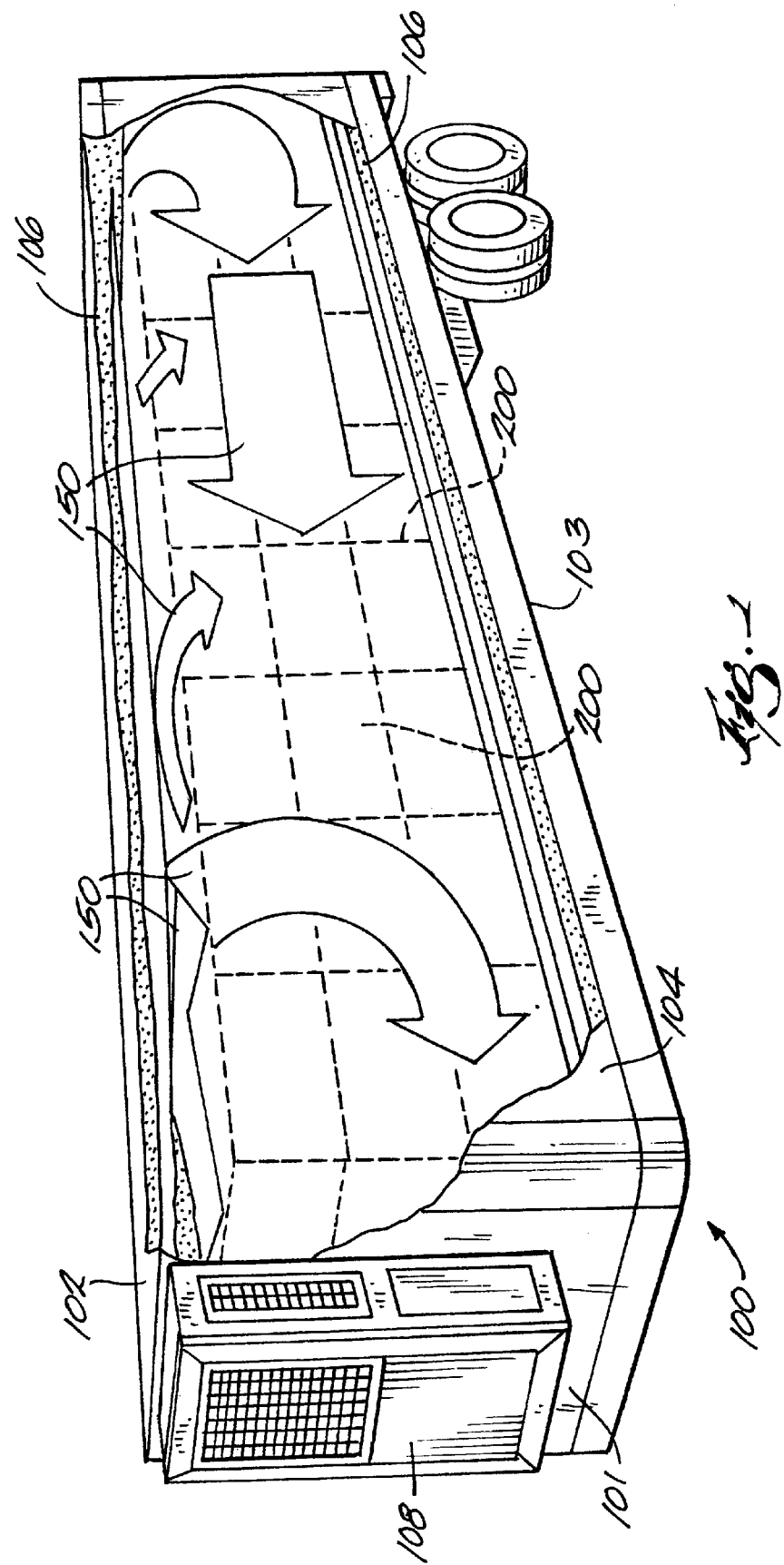
FIG. 1 is a cutaway front perspective view of a trailer with a temperature control unit located on the front end of the trailer.

Turning to the drawing figures wherein like parts are identified by the same numbers throughout the disclosure, FIG. 1 illustrates a conventional trailer 100, that includes front panel 101, top panel 102, bottom panel 103, and side panels 104 and 105 which join the front, top, and bottom panels. The top, bottom, front and side panels define a conditions space 106 that is maintained at a predetermined required temperature by a temperature control system 108 mounted along the exterior of the front panel 101. The temperature control unit 108 is of conventional design well known to one skilled in the art and includes a conventional evaporator heat exchanger 110 that extends through the front panel 101 and into the conditioned space 106. See FIG. 2.

A palletized load 200 is loaded in the conditioned space 106 so that conditioned air flows outward from the evaporator and around the load in the direction of arrows 150 in FIG. 1 through spaces between the load 200 and the trailer panels 101, 102, 103, 104, 105 and rear trailer doors which are not illustrated. The conditioned air travels from the front of the trailer around the load to the rear of the trailer and returns to the front of the trailer where the air is again flowed through the evaporator. The return air passes behind the bulkhead of the present invention before flowing into the evaporator.

Now turning to the air return bulkhead of the present invention 10, As shown in FIGS. 2–7, the air return bulkhead is located in conditioned space 106 and is attached to the inside portion of the front trailer wall 101 behind the temperature control unit. The bulkhead is adapted to be fitted around evaporator 110. The manner of attaching the bulkhead to the front wall and fitting the bulkhead around the evaporator unit will be discussed in further detail hereinbelow.

Bulkhead 10 has a unitary body that is comprised of a molded plastic material which is preferably polyethylene. Bulkhead 10 includes base 12 which defines base plane 13. For clarity and illustrative purposes, the base plane 13 is shown extended in dashed font in FIGS. 4, 5, and 6. The base includes an endless raised lip 15 along the outer periphery of the base. Lip 15 has a semicircular cross section.

The bulkhead includes a rigid flow duct 11 substantially centrally located on base 12. The rigid flow duct includes first side wall 14, second side wall 16, third wall 18 along the top of the bulkhead, fourth wall 20 along the bottom of the bulkhead and front wall 22. The bottom wall 20 joins the sidewalls 14 and 16; and the front wall joins the side, top, and bottom walls and is substantially parallel to base 12. The flow duct walls define a flow chamber 25. As a result of the flow duct configuration described above, during operation of temperature control unit 108, the flow duct does not float or buckle and maintains its substantially rectangular shape as illustrated in the figures.

Angled wall 23 joins top wall 18 and first side wall 14, and angled wall 24 joins side wall 16 and top wall 18. The angled walls 23 and 24 serve to evenly distribute and direct the return air passing through the flow duct chamber 25 into the evaporator 110. Walls 14, 16, 18, 20, 23, and 24 extend outwardly from, and perpendicular to base 12.

An elongated, recessed rib 32 is located on the front wall 22 and extends laterally with the closed rib ends proximate the angled walls 23 and 24. The co-inventors believe that the rib does not enhance the flow of return air through the flow chamber to the evaporator 110, but rather serves to stiffen the air duct without having to fasten additional portions of the bulkhead unit to the front trailer wall 101. It is desirable to keep the number of fasteners used at a minimum because each time fasteners are passed through the bulkhead openings are created in the bulkhead that allow air discharged out the evaporator to undesirably short cycle and leak past the bulkhead back into the flow chamber without first flowing around load 200.

Figure 3:
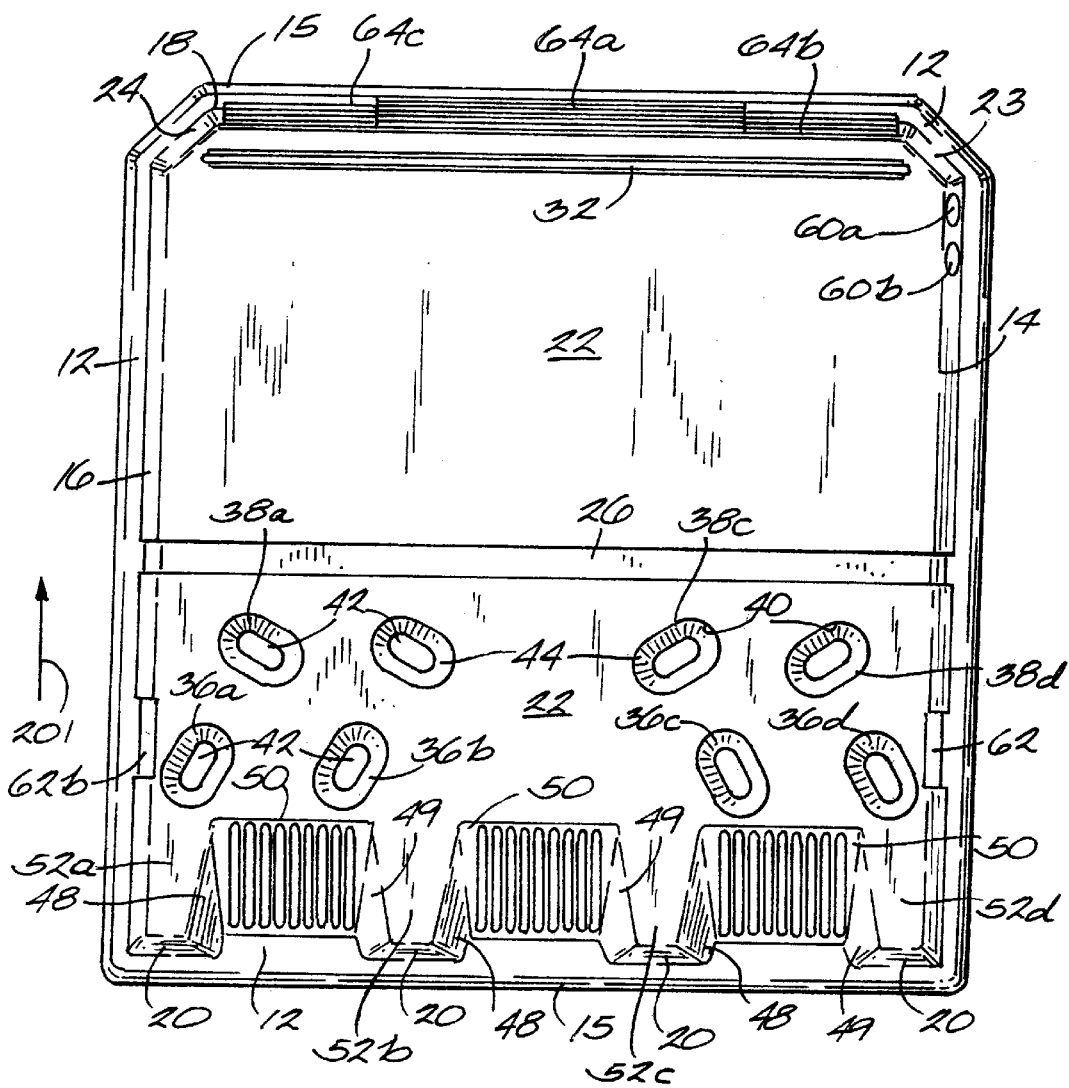
FIG. 3 is a front plan view of the bulkhead shown in FIG. 2.

As shown in FIG. 3, recessed seam 26 extends laterally across front wall 22, first side wall 14, and second side wall 16. The seam may be cut by a technician to allow service access to the evaporator 110 without having to remove the entire bulkhead. Also, frequently the bulkhead will be purchased with the temperature control unit 108 as part of a trailer temperature control system and in such situations it is convenient to ship the bulkhead with the temperature control unit. In order to fit the bulkhead into the shipping crate with the temperature unit, the bulkhead may be cut into two pieces along the seam 26. The two bulkhead pieces are then realigned and reassembled along the seam during bulkhead installation in the trailer.

Figure 4:
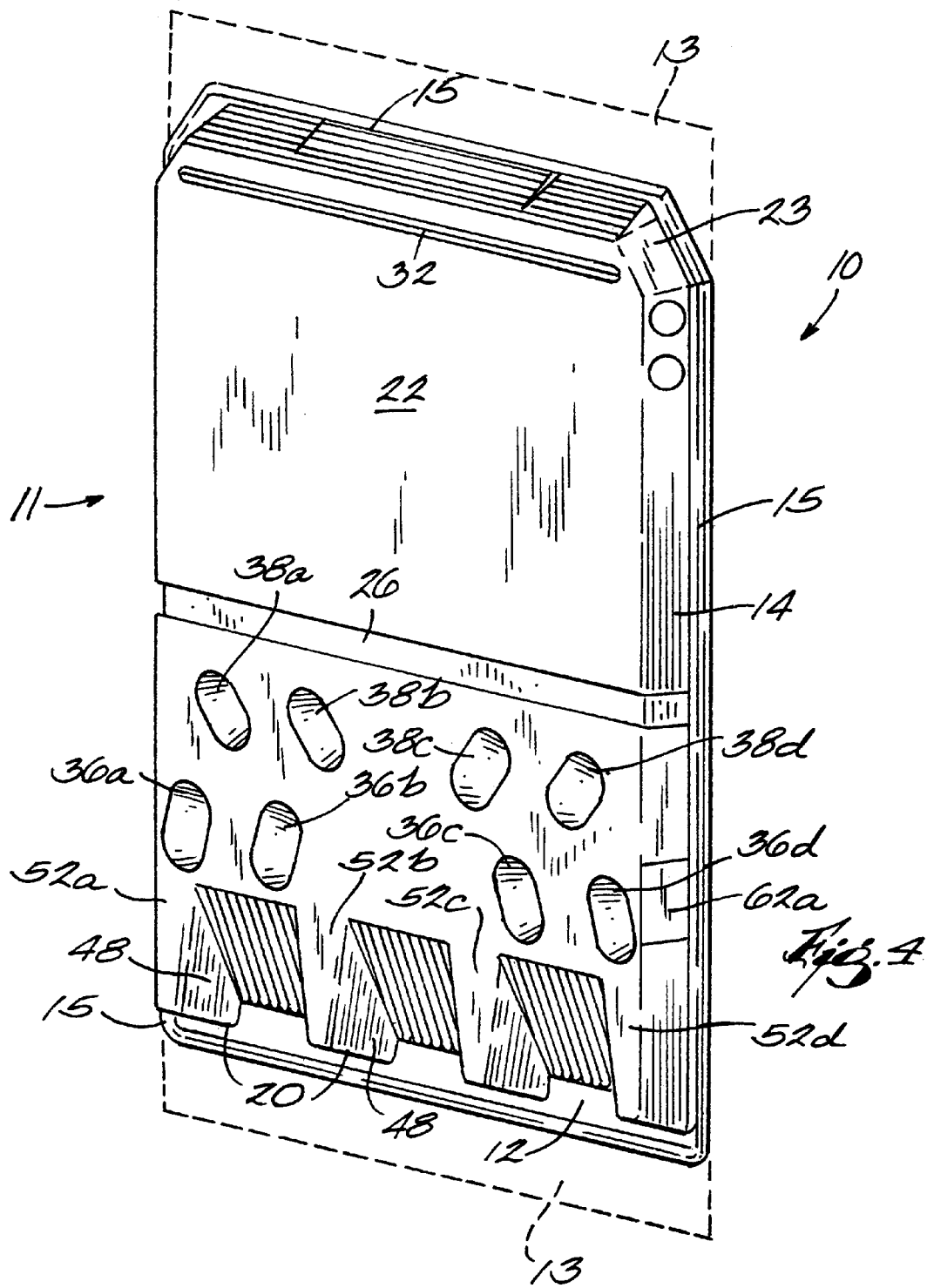
FIG. 4 is a front perspective view of the bulkhead of FIG. 3.
Figure 5:
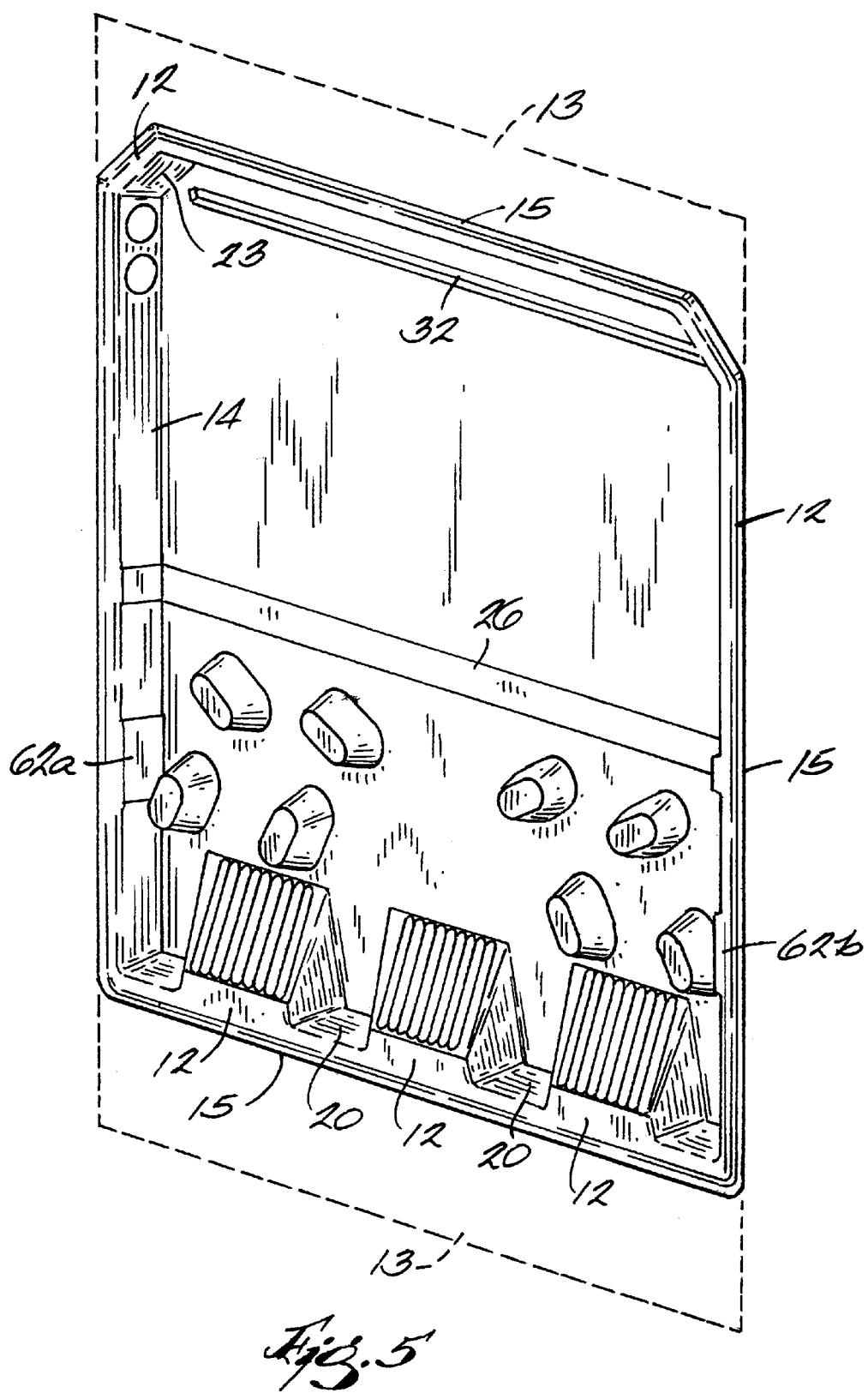
FIG. 5 is a rear perspective view of the bulkhead of FIG. 3.
Figure 6:
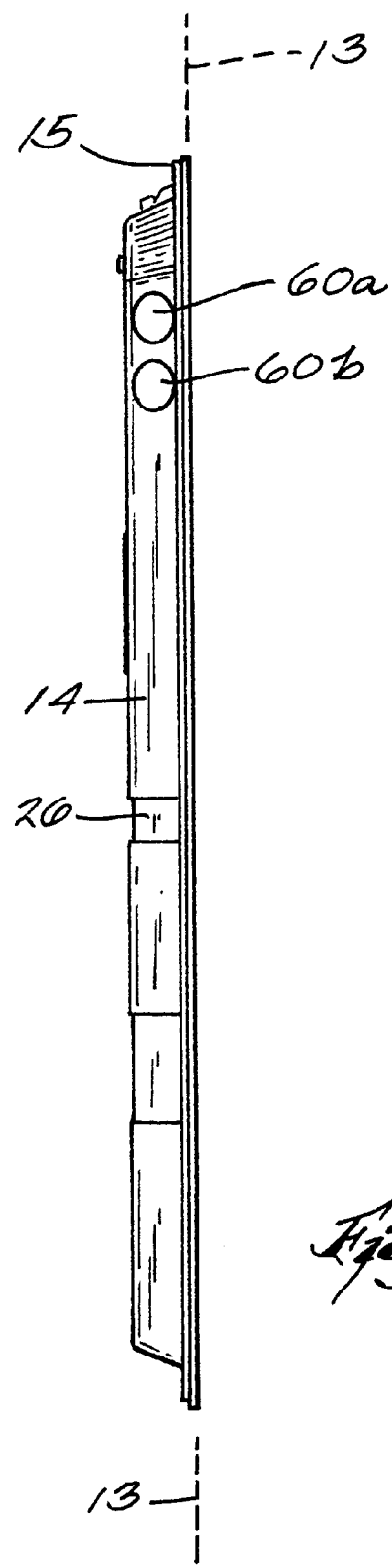
FIG. 6 is a right side view of the bulkhead of FIG. 3.

Now turning to FIGS. 3–5, the bulkhead 10 includes molded support columns 36a–d, 38a–d along the front wall 22 below seam 26. The support columns are arranged into one array of laterally aligned upstream support columns 36a, 36b, 36c, and 36d; and one array of laterally aligned downstream support columns 38a, 38b, 38c, and 38d. Each column includes an access opening 40, a closed end 42 coplanar with base plane 13, and wall 44 extending between the access opening and the closed end. The wall 44 of each column is tapered inwardly as each support column wall extends from the respective access opening to the closed column end.

As shown in FIG. 3, the upstream support columns 36a–d are directed upwardly and inwardly toward the middle of the bulkhead in the direction 201 of flow of return air through the chamber 25. The downstream support columns 38a–d are directed upwardly and outwardly away from the center of the bulkhead in the direction of flow 201 through the chamber 25. In this way, corresponding adjacent upstream and downstream support columns for example 36a, 38a; 36b, 38b; 36c, 38c; and 36d, 38d; are oriented in opposite directions and are substantially perpendicular. See FIG. 4. It is believed that grouping and orienting the support columns in this manner creates turbulent air flow through the flow chamber 25 and as a result the air flow mixes thoroughly so that the air returned to the evaporator 110 has a temperature that is substantially constant for the entire volume of return air. Prior art bulkheads do not create the turbulent return air flow through the bulkhead.

When the bulkhead is installed in a trailer conditioned space 106, the closed support column faces 42 and base 12 are butted against front trailer panel 101. The elongated shape of the columns allows a technician installing the bulkhead to easily insert a standard tool, such as an air powered rivet gun, into the open column to drive at least one fastener through the closed column face 42 and panel 101. The support columns overlay trailer wall 101 support members so that when fasteners are passed through ends 42, they are driven into the wall support members.

For purposes of describing the preferred embodiment of the invention four support columns are shown and described however it should be understood that any suitable number of upstream and downstream support columns may be included in bulkhead 10.

Return air inlet notches 46a, 46b, and 46c are formed in flow duct 11. Each inlet notch is defined by inlet walls 48, 49, and 50 which join front wall 22 and the base 12. The inlet walls are tapered inwardly as they extend downwardly from the front wall 22 to base 12. By inwardly tapering the cavity walls in this manner, the return air is more efficiently guided into the flow chamber 25 through the plurality of spaced apart inlet slots 51 formed on each inlet cavity wall 50. The aligned slots promote uniform air distribution across the evaporator and prevent debris from plugging the bulkhead and evaporator.

The inlet notches 46a, 46b, and 46c result in molded pallet stops 52a, 52b, 52c, and 52d. Stops 52b and 52c separate inlet notch 46b from adjacent notches 46a and 46c. Pallet stops 52a and 52d enclose the outer portions of inlet notches 46a and 46c respectively. Stop 52b and 52c are defined by front wall 22, bottom wall 20, and notch walls 48 and 49. Pallet stop 52a is defined by front wall 22, inlet cavity wall 48, bottom wall 20 and first sidewall 14. Pallet stop 52d is defined by front wall 22, inlet cavity wall 49, bottom wall 20 and second sidewall 16. The four pallet stops impede the forward movement of pallets as they are placed on the bottom trailer panel 103 and also the cargo 200 as it is placed on the pallets. In this way, the air flow to the inlet notches is not blocked.

Figure 2:
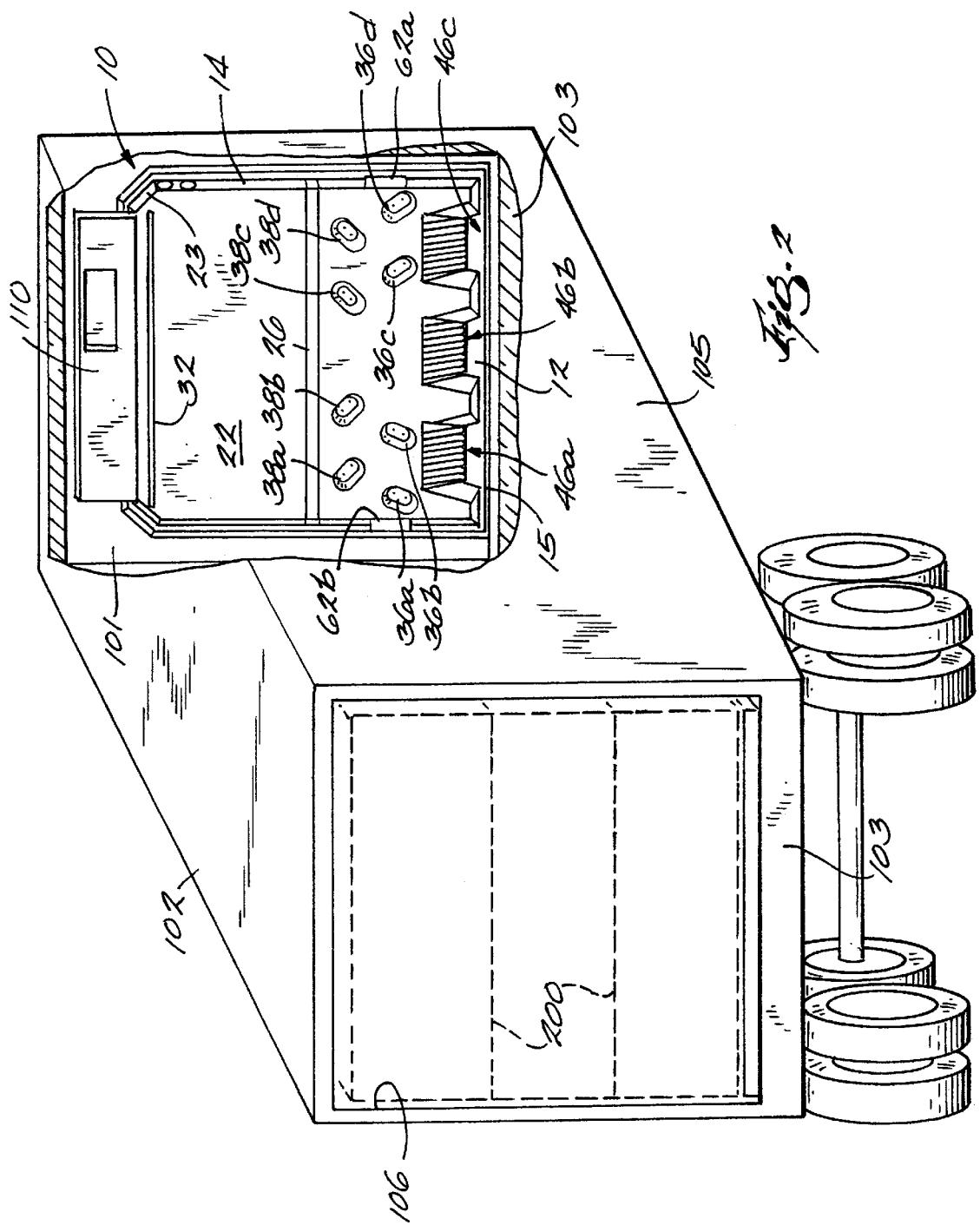
FIG. 2 is a rear perspective view of the trailer of FIG. 1 with a portion of the trailer cut away to show the bulkhead of the present invention mounted on the front trailer wall behind the temperature control unit.

Top wall 18 includes a plurality of steps 64. The steps are formed with middle step portion 64a having a height that is greater than side step portions 64b and 64c. As shown in FIG. 2, the steps are designed to act as an aide in making a cut out for the refrigeration unit evaporator to fit the bulkhead around the evaporator unit. The steps also act as stiffening ribs which support the area around the cutout portion of the steps and top wall.

Side wall 14 includes short cycle inlets 60a and 60b which are closed when the bulkhead is formed. The inlets can then be cut open as required to permit a volume of the air discharged from evaporator 110 to short cycle and return to chamber 25. A small volume of short cycled air is desirable to help prevent top freeze in fresh cargo such as lettuce. If frozen cargo is transported in the conditioned space, short cycling air is not desirable and so in this application the short cycle inlets would not be removed.

The side walls 14 and 16 include air dam locator recesses 62a and 62b respectively. Air dams 70 are adapted to be removably located in air dam recesses 62a and 62b and the air dams serve to prevent short cycling of evaporator discharge air back into the inlets 46a, 46b, and 46c, by the "dam" defined by the air dam, respective trailer side panel 104, 105 and bulkhead side walls 14, 16. See FIG. 7.

Air dams 70 are the same so that as the description proceeds only air dam will be described. As illustrated in FIG. 8, air dam 70 has a substantially U-shaped cross section comprised of sides 71, 72, and 73. The sides terminate at free edges 66 and 67. Additionally, flanges 68 and 69 are provided along portions of the free edges of respective sides 71 and 73, and recesses 74, 75 are also provided at the free edges of respective sides 71 and 73 adjacent the flanges. A recess 74 is provided in side 72 and a tubular handle 76 is located in the oval recess 74 and extends longitudinally across the recess. The handle is used for gripping the air dam when seating the air dam in or removing the air dam from its respective locator recess 62a,b.

The recesses 74 and 75 are adapted to receive the base lip 15 when the air dam is seated in the recess 62a, 62b. In this way, the recess and lip serve to orient and locate the air dam in the desired manner. FIG. 7 shows the air dams seated in recesses 62a and 62b. Edges 66 are butted against recess 62a and 62b, and the air dam is slid towards base 12. The edges 67 are butted against trailer walls 104, 105. The air dam is slid until flanges 68, 69 contact trailer wall 101 and sides 71 and 73 come into contact with base 12. Rivets or other conventional fasteners are then run through flanges 68 and 69 to removably attach the air dams to the front wall. When in place, the air dam side 72 is substantially coplanar with front wall 22 so that any cargo loaded against is also flush against the air dams to further prevent leaking past the air dams.

As shown in FIG. 7, the bulkhead may include removable pallet stops 90a, 90b, 90c, and 90d that may be slid over respective molded pallet stops 52a, 52b, 52c, and 52d. The removable pallet stops may be replaced when they are damaged without the need to replace the complete bulkhead. As shown in FIG. 9 the pallet stops include sides 92, 93 which are joined by top 94. Sides 92 and 93 have respective side flanges 95a, 95b that extend completely along the side free edge.

Depending on the intended location of the pallet stop, recesses 96a and/or 96b are formed in either both or one of the side flanges. For example, the pallet stops 90b and 90c that enclose molded pallet stops 52b and 52c have two recesses 96a and 96b. The sides 92 and 93 of stops 90b and 90c are passed through slots 51 of adjacent inlet notches until the flanges are seated against base 12 and trailer wall 101. The recesses are adapted to receive a portion of inlet notch wall 50 as the flanges are seated on the base and trailer wall 101.

The removable pallet stops 90a and 90d that enclose respective molded pallet stops 52a and 52d only include a single recess 96b and 96a respectively. As the pallet stop 90a is located over pallet stop 52a, side 93 and flange 95 are passed through slot 51, and side 92 is located closely adjacent sidewall 16. As the pallet stop 90d is located over pallet stop 52d, side 92 and flange 95 are passed through slot 51, and side 93 is located closely adjacent sidewall 14. In both instances, the pallet stops are slid toward the corresponding molded pallet stop until the flange 95 adjacent the duct sidewall is seated against the trailer wall 101, and the opposite flange is seated against wall 101 and base 12. The pallets are then removably fastened to the trailer wall at the flanges 95 by a conventional means such as rivets.

While we have illustrated and described a preferred embodiment of our invention it is understood that this is capable of modification, and we therefore do not wish to be limited to the precise details set forth, but desire to avail ourselves of such changes and alterations as fall within the purview of the following claims.

Having described the invention, what is claimed is:

1. An air return bulkhead comprising:
    a base;
    a return air duct extending outward from the base and including at least one air dam recess, the base and air duct defining a bulkhead return air chamber;
    at least one return air inlet formed in the air duct;
    a first array of support columns in the return air chamber extending upwardly and inwardly in a direction of return air flow through the return air chamber; and
    a second array of support columns in the return air chamber extending upwardly and outwardly in the direction of return air flow through the return air chamber;
    the first and second arrays of support columns being downstream of the at least one return air inlet and being operable to produce turbulent return air flow through the return air chamber.

2. The air return bulkhead as claimed in claim 1 wherein the return air duct is comprised of a top wall; a first side wall; a second sidewall; a bottom wall and a front wall joining the sidewalls, the top wall and the bottom wall.

3. The air return bulkhead as claimed in claim 2 wherein the at least one return air inlet extends through portions of the front wall and the bottom wall.

4. The air return bulkhead as claimed in claim 2, wherein the first and second sidewalls each include a side air dam recess.

5. The air return bulkhead as claimed in claim 4 wherein the side air dam recess is a slot.

6. The air return bulkhead as claimed in claim 2 wherein the front wall includes a stiffening rib extending between the first and second air duct sidewalls.

7. The air return bulkhead as claimed in claim 2 further comprising a first angled sidewall joining the top wall and the first sidewall; and a second angled sidewall joining the top wall and the second sidewall.

8. The air return bulkhead as claimed in claim 2 wherein the bulkhead further comprises a seam along each of the front wall, the first sidewall and the second sidewall, the seam defining a separating zone for separating the bulkhead into two or more portions such that access to the rear of the bulkhead can be provided by removing only one of the portions.

9. The air return bulkhead as claimed in claim 8 wherein the seam is located along the bulkhead downstream of the support columns.

10. The air return bulkhead as claimed in claim 2 wherein each support column includes an access opening formed on the front wall, a closed end, and a column wall joining the access opening and the closed end.

11. The air return bulkhead as claimed in claim 10 wherein the base defines a base plane and wherein the closed end of each column is in the base plane.

12. The air return bulkhead as claimed in claim 1 further comprising side air dam members extending away from the return air duct.

13. The air return bulkhead as claimed in claim 1 further comprising removable pallet stop members.

14. The air return bulkhead as claimed in claim 1 wherein the bulkhead is unitary.

15. The air return bulkhead as claimed in claim 1 wherein the bulkhead is made from polyethylene.

16. An air return bulkhead for use with an enclosure having a front panel and first and second side panels coupled to the front panel, the bulkhead comprising:
a base coupled to the front panel;
a return air duct extending outward from the base and having a first sidewall, a second sidewall, and at least one return air inlet, the base and air duct defining a bulkhead return air chamber;
a first air dam member extending away from the first sidewall toward the first side panel to substantially block an air passageway extending between the first sidewall and the first side panel; and
a second air dam member extending away from the second sidewall toward the second side panel to substantially block an air passageway extending between the second sidewall and the second side panel.

17. The air return bulkhead as claimed in claim 16 wherein each of the first and second sidewalls include an air dam recess for receiving the respective air dam member.

18. The air return bulkhead as claimed in claim 17 where the air dam recesses are slots.

19. The air return bulkhead as claimed in claim 16 wherein the air dams are removable from the bulkhead.

20. The air return bulkhead as claimed in claim 19 wherein each of the air dams includes a handle for gripping the air dam during insertion or removal of the air dam.

21. The air return bulkhead as claimed in claim 16 wherein the air dam members have a substantially U-shaped cross section.

22. An air return bulkhead comprising:
a base;
a return air duct extending outward from the base and having a first sidewall, a second sidewall, at least one return air inlet, and an integrally formed pallet stop adjacent the at least one inlet, the base and air duct defining a bulkhead return air chamber; and
at least one removable pallet stop adjacent the at least one inlet and positionable over the integrally formed pallet stop to protect the integrally formed pallet stop.

23. The air return bulkhead as claimed in claim 22 wherein the at least one removable pallet stop has a substantially U-shaped cross section.

* * * * *